(12) United States Patent
Howcroft et al.

(10) Patent No.: US 8,769,264 B2
(45) Date of Patent: *Jul. 1, 2014

(54) APPARATUS AND METHOD FOR MONITORING CERTIFICATE ACQUISITION

(71) Applicant: AT&T Intellectual Property I, LP, Atlanta, GA (US)

(72) Inventors: Jerald R. Howcroft, Beverly Hills, MI (US); Benjamin Jahner, Sweetwater, TN (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/667,321

(22) Filed: Nov. 2, 2012

(65) Prior Publication Data

US 2013/0061042 A1 Mar. 7, 2013

Related U.S. Application Data

(63) Continuation of application No. 12/575,490, filed on Oct. 8, 2009, now Pat. No. 8,356,172.

(51) Int. Cl.
*H04L 29/06* (2006.01)
*G06F 21/00* (2013.01)

(52) U.S. Cl.
USPC .................... 713/156; 713/175; 713/176

(58) Field of Classification Search
None
See application file for complete search history.

(56) References Cited

U.S. PATENT DOCUMENTS

| | | |
|---|---|---|
| 2003/0093676 A1 | 5/2003 | Kawamura |
| 2004/0093493 A1 | 5/2004 | Bisbee |
| 2005/0154878 A1 | 7/2005 | Engberg |
| 2008/0168524 A1 | 7/2008 | Wood |

*Primary Examiner* — Gilberto Barron, Jr.
*Assistant Examiner* — Malcolm Cribbs
(74) *Attorney, Agent, or Firm* — Guntin & Gust, PLC; Jay H. Anderson

(57) ABSTRACT

A system that incorporates teachings of the present disclosure may include, for example, a set-top-box having a controller to transmit a request to a remote management server for status information associated with a x.509 certificate intended for the STB, and receive the status information associated with the x.509 certificate from the remote management server, where events associated with the status information are received by the remote management server from at least one of the STB, a certificates proxy, an external certificate web service, and a certificate authority, and where the status information comprises at least a portion of the received events. Other embodiments are disclosed.

20 Claims, 12 Drawing Sheets

500

X.509 certificate Acquisition Settings:

| Use Case | Select Acquisition Timeframe | |
|---|---|---|
| Entire market area (VHO): | Initial Request:<br>Retries: | 2 hours or less<br>6 hours or less |
| Certificate acquisition for newly provisioned STB's after the initial CA rollout (or re-provisioned STB's): | Initial Request:<br>Retries: | immediate<br>30 minutes |
| Normal operation after reboot and after prior successful certificate acquisition | Initial Request:<br>Retries: | immediate<br>30 minutes |
| Certificate expiration: | Initial Request:<br>Retries: | 2 to 4 weeks before expire<br>6 hours or less |
| Certificate revocation and renewal for compromised certificates due to fraud or to replace certificate during troubleshooting | Initial Request:<br>Retries: | immediate<br>30 minutes |

Viewer or in home technician accesses the x.509 certificate acquisition status screen from the IPTV STB to determine the status of their x.509 certificate. The viewer / technician can request a retry of the certificate acquisition from this screen if desired by selecting the yellow triangle smart key.

800

Remote Management System – X.509 certificate Acquisition status

Please select the desired option

- ☐ Poll the x.509 status for an individual STB...

STB GUID: ▮

- ☐ Poll the x.509 status for all STB's within an individual household...

Address: ▮

- ☐ Summary report for logged completion of x.509 certificate acquisition for the entire market area (VHO)...

Market Area (VHO): ▮

900
FIG. 9

Remote Management System – X.509 certificate Acquisition status for individual STB

| | |
|---|---|
| STB GUID: | ABCD |
| X.509 Certificate Status: | Certificate Present |
| Certificate authority: | Verisign |
| Certificate Acquisition Last Request Date and Time: | 12/11/08 15:15:10 |
| Certificate Acquired Date & Time: | 12/11/08 15:16:12 |
| Certificate Expiration Date: | Between 1/11/10 and 12/11/10 |
| Certificate Revoked: | No |

APPARATUS AND METHOD FOR MONITORING CERTIFICATE ACQUISITION

CROSS-REFERENCE TO RELATED APPLICATIONS

This application is a continuation of and claims priority to U.S. patent application Ser. No. 12/575,490 filed Oct. 8, 2009 which is incorporated herein by reference in its entirety.

FIELD OF THE DISCLOSURE

The present disclosure relates generally to monitoring and alerting services and more specifically to an apparatus and method for monitoring certificate acquisition.

BACKGROUND

The Internet and other networks have provided users with the ability to exchange information, data, and content in a rapid and efficient manner. However, it is important for such users to be able to exchange such information securely and privately. The use of digital certificates can foster such secure and private exchanges. Digital certificates can utilize digital signatures to bind together a public key with a particular identity and can serve as means to verify that the public key belongs to a particular individual/identity. In public key infrastructures (PKIs), the digital signature can be of a certificate authority (CA), which can issue the digital certificates that contain the public key, the identity of the owner, and other relevant information. Enabling customization of certificate acquisition settings can provide increased functionality and monitoring certificate acquisitions can provide relevant status information regarding a particular certificate.

BRIEF DESCRIPTION OF THE DRAWINGS

FIG. 6 depicts an exemplary application screen for customizing certificate acquisition settings;

FIG. 9 depicts an application screen for a service provider for selecting certificate acquisition status options;

FIG. 10 depicts an application screen showing status information for certificate acquisition for a given media device;

DETAILED DESCRIPTION

One embodiment of the present disclosure can entail a set-top-box (STB) having a controller to transmit a request to a remote management server for status information associated with a x.509 certificate intended for the STB, wherein at least one of the STB and the remote management server (RMS) operate in an interactive television (iTV) network, and receive the status information associated with the x.509 certificate from the RMS, wherein events associated with the status information are received by the RMS from at least one of the STB, a certificates proxy, an external certificate web service, and a certificate authority, and wherein the status information comprises at least a portion of the received events.

Another embodiment of the present disclosure can entail a method including receiving a request from a computing device for status information associated with a digital certificate intended for the computing device, wherein the computing devices is in communication with an interactive television (iTV) network, receiving events from at least one of a certificates proxy, an external certificate web service, a certificate authority, and the computing device, wherein the status information is associated with at least one of the received events, and transmitting the status information associated with the digital certificate to the computing device in response to the request, wherein the status information is presented at the computing device.

Yet another embodiment of the present disclosure can entail a computer-readable storage medium having computer instructions to establish certificate acquisition settings associated with a digital certificate intended for a computing device, transmit a request for the digital certificate based on the certificate acquisition settings, transmit a request to a server for status information associated with acquisition of the digital certificate, wherein events associated with the status information are received by the server from a plurality of sources, and wherein the status information comprises at least a portion of the received events, and receiving the status information associated with acquisition of the digital certificate from the server.

Figure 1:
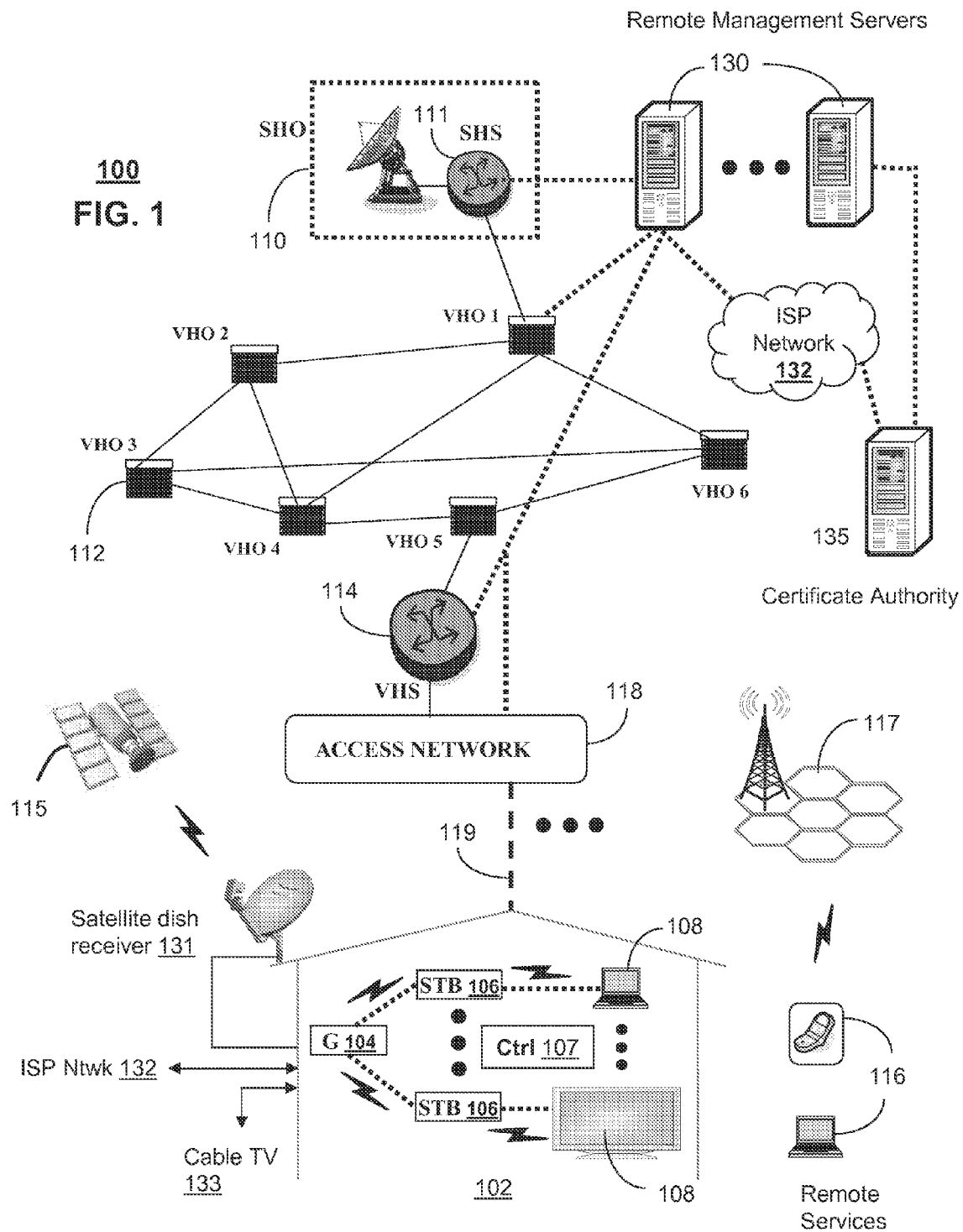
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a certificate authority 135. The certificate authority 135 can be a server, processor, or other similar device capable of performing processing operations. The certificate authority 135 can be configured to be operably coupled to ISP network 132, and iTV network, and to any of the devices in the system 100. Notably, the certificate authority 135 can be configured to issue digital certificates including, but not limited to, digital certificates which conform to the x.509 ITU-T standard for public key infrastructures (PKI). In operation, the certificate authority 135 can issue digital certificates which can include a public key and the identity and/or identification information associated with an owner of the identity/identification information.

Devices in the system 100, such as the STBs 106, can transmit requests for digital certificates, which can be relayed to the certificate authority 135, when attempting to access an application, web site, or portal. The certificate authority 135 can sign the requested digital certificate and verify the credentials of the owner, so that requesting devices can trust the information in the certificates provided by the certificate authority 135. The certificate authority 135 can then transmit the signed certificate to the requesting devices and to the application, website, or portal so as to enable the requesting devices and the application, web site, or portal to securely communicate with each other.

Additionally, the devices in the system 100 can be configured to transmit requests for information pertaining to the acquisition of the certificate. Also, customization settings can be set with regards to the acquisition of the digital certificates. For example, STB 106 can establish settings which determine when a certificate is to be delivered, when to retransmit a certificate, when a certificate expires, if the certificate is actually delivered, when a certificate is revoked, and other settings associated with acquiring a digital certificate.

Another distinct portion of the computing devices 130 can function as a RMS (herein referred to as RMS 130). The RMS 130 can use common computing and communication technology to perform the function of processing, managing, and storing information received from various devices in the system 100. The RMS 130 can be operably coupled to an iTV network and can be configured to receive and maintain certificate acquisition settings and events from other devices in the system 100 relating to digital certificate acquisitions. For example, the RMS 130 can receive information from external certificate web services, STBs, certificate proxies, and certificate authorities. Additionally, the RMS 130 can be configured to display the events and other information associated with digital certificate acquisitions to other devices in the system 100.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
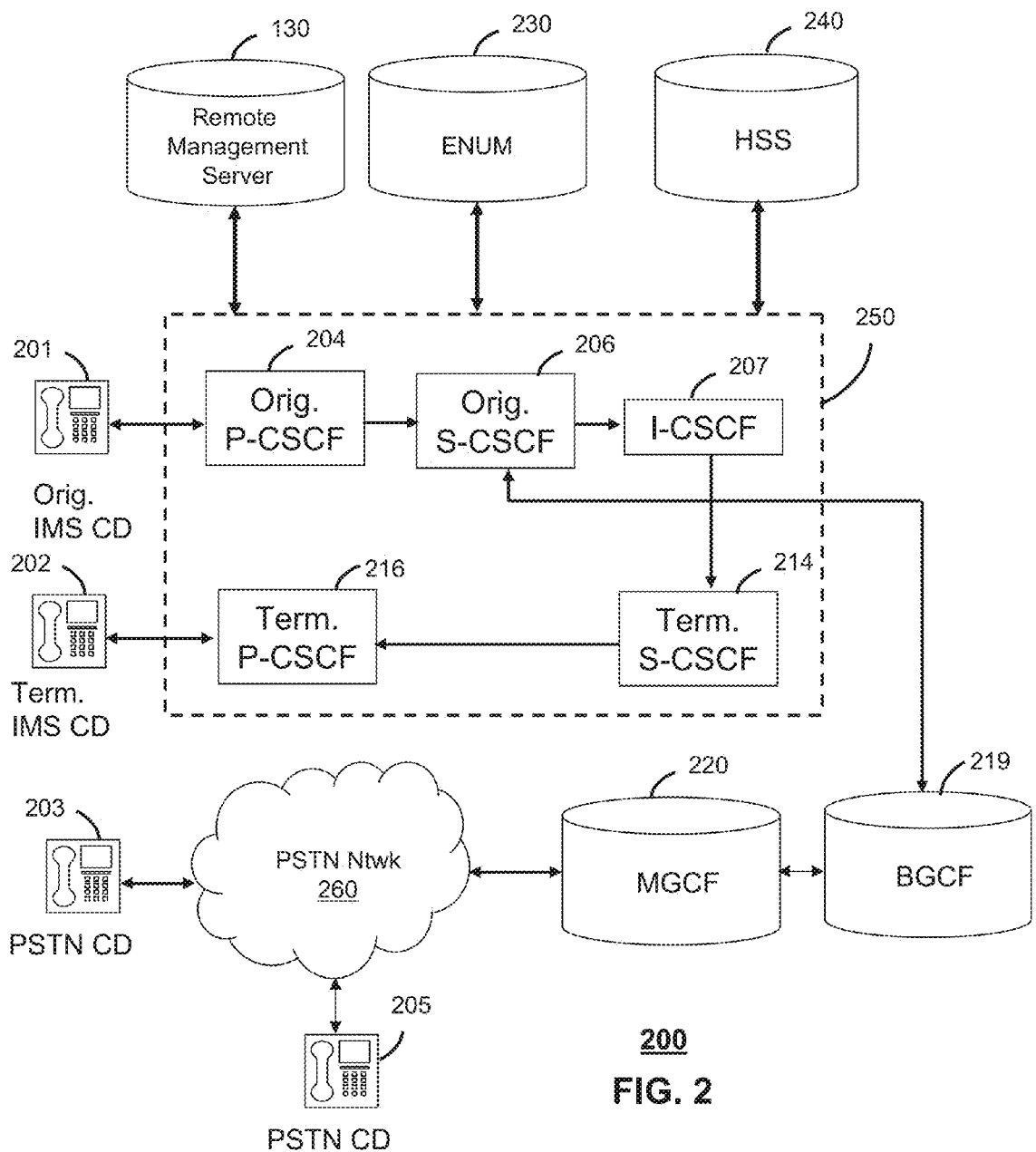

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The RMS 130 of FIG. 1 can be operably coupled to the second communication system 200 for purposes similar to those described above.

Figure 3:
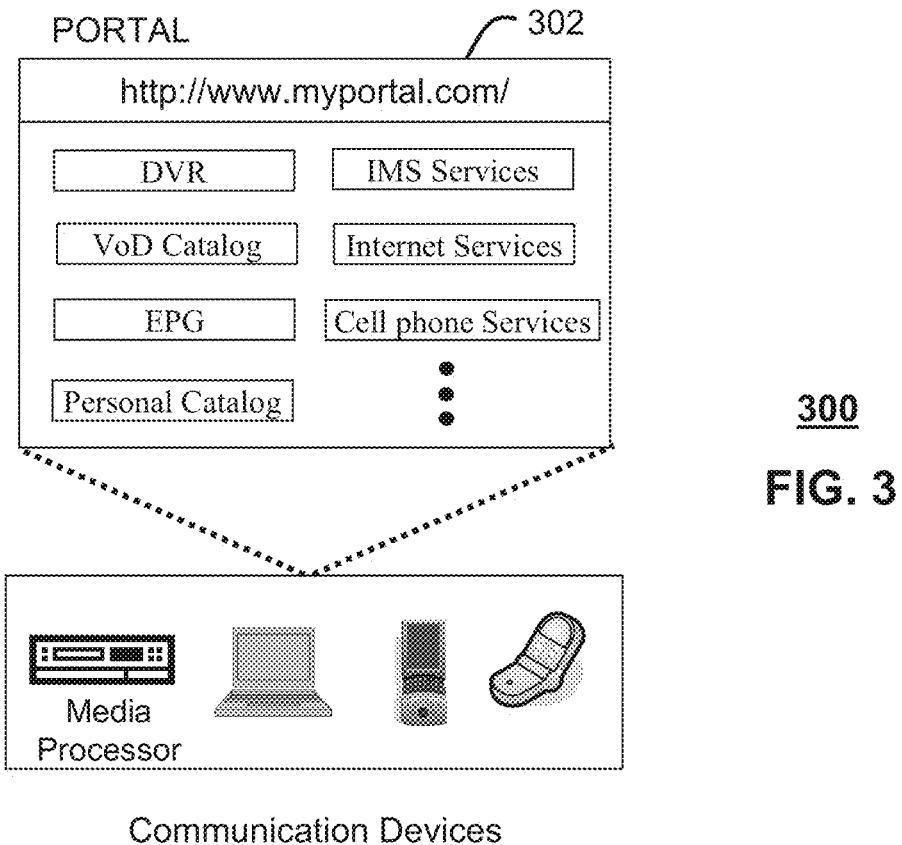
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
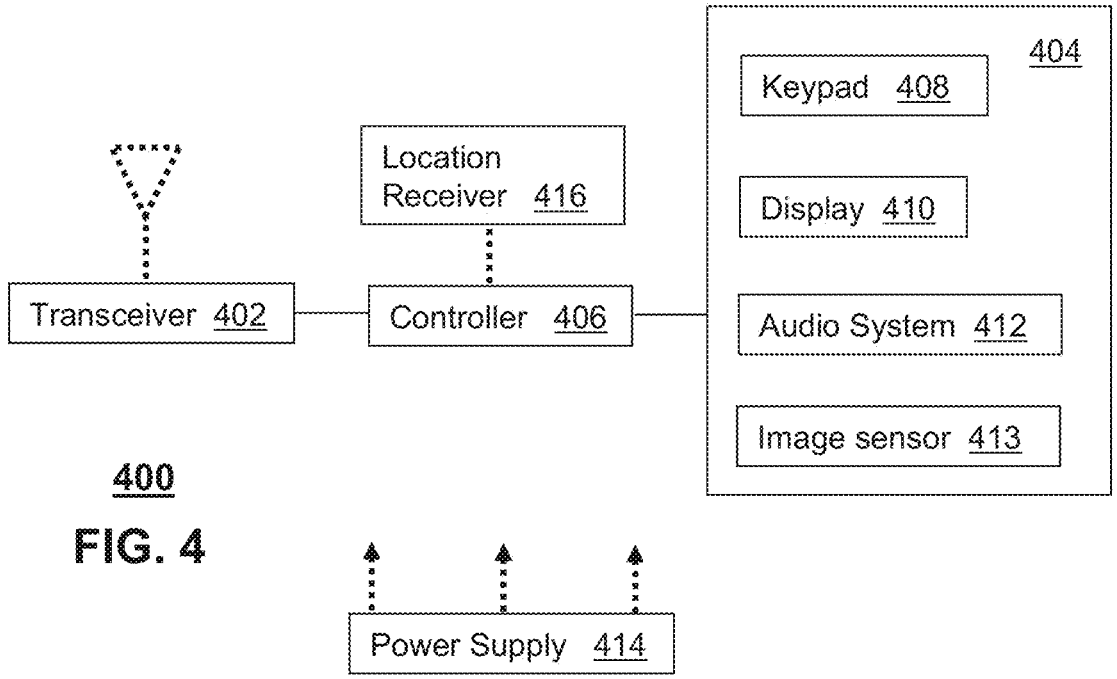
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
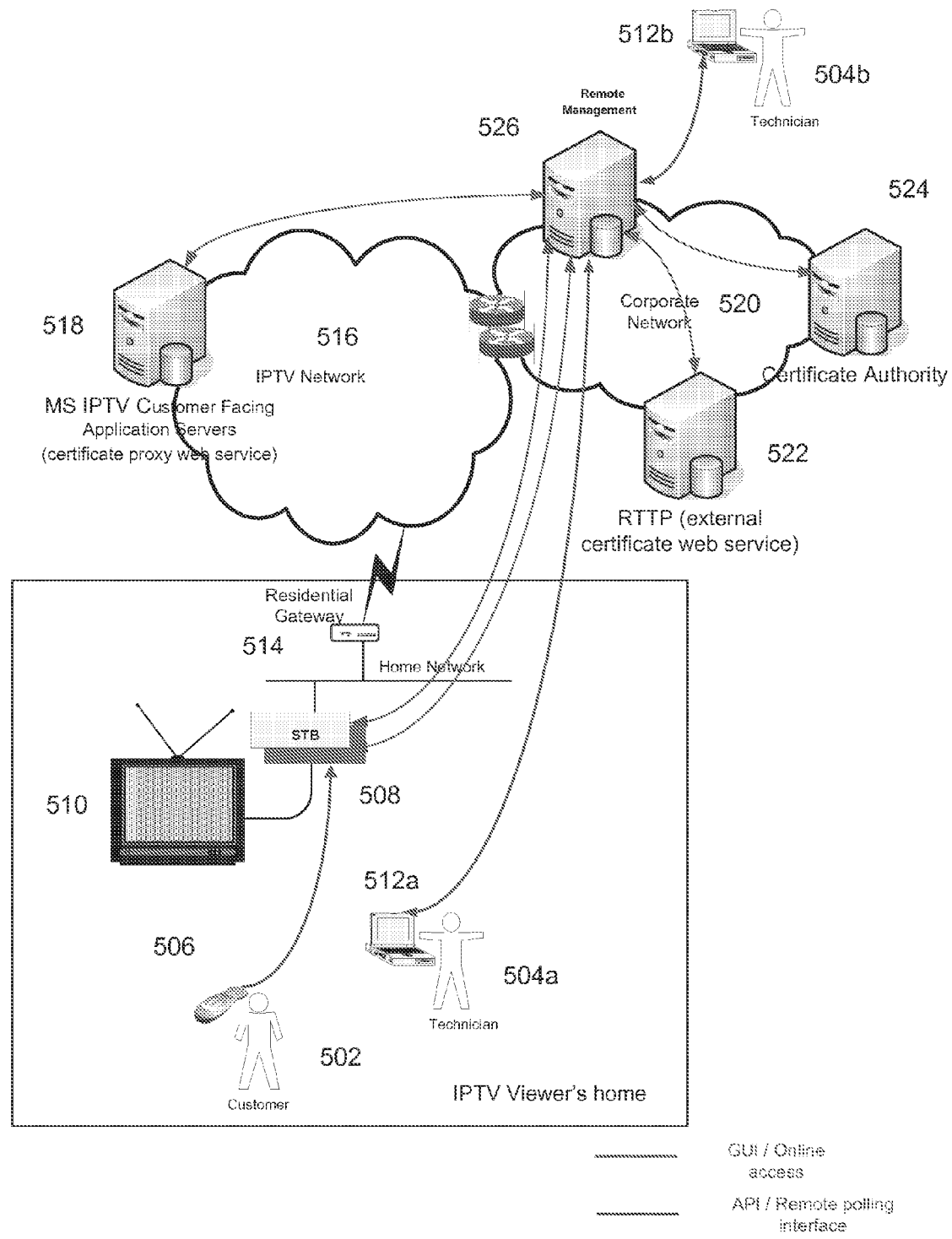
FIG. 5 depicts an illustrative embodiment of a system for monitoring certificate acquisition, which can operate in portions of the communications systems of FIGS. 1-2.

FIG. 5 depicts an illustrative embodiment of a system 500 for monitoring certificate acquisition, the system 500 operable in portions of the communication systems of FIGS. 1-2. The devices in the system 500 can be configured to operate in an iTV network. The iTV network can include interactive cable television, IPTV, and interactive satellite television. The system 500 can include a user 502 and one or more technicians 504a-b. Technician 504a can be at or near the user 502's residence and technician 504b can be located at or near a service provider utilized by and/or associated with the user 502. The user 502 can utilize a remote control device 506, which can be configured to enable the user to access and interact with STB 508. STB 508 can be configured to display media content and a graphical user interface (GUI) associated with an iTV application on display device 510. Display device 510 can be a monitor, television, or other similar device for viewing media and other content.

Technicians 504a and 504b can utilize computing devices 512a and 512b. The computing devices 512a and 512b can, for example, be a laptop computer, a personal computer, a mobile device, a telephone, or other device capable of transmitting and receiving information from the devices of system 500. The system 500 can also include a residential gateway 514, which can be operably coupled to the STB 508 and can serve as an interface to IPTV network 516. The IPTV network 516 can include one or more IPTV customer facing application servers 518, which can serve as a certificate proxy web service. IPTV network 516 can be communicatively linked to a communications network such as corporate network 520.

Corporate network 520 can include a Real Time Transaction Processor (RTTP) 522 for providing external certificate web services. Additionally, corporate network 520 can be communicatively linked to a certificate authority 524, which can be configured to provide and sign digital certificates, such as those conforming to the x.509 standard for PKIs. The corporate network 520 can further include a RMS 526. The RMS 526 can be configured to receive, store, and maintain various events from the devices in the system 500. The events can be associated with or can provide status information pertaining to digital certificates traversing the system 500 and, in particular, digital certificates intended for STB 508.

Operatively, the user 502 and/or the technicians 504*a-b* can set a variety of certificate acquisition settings associated with acquiring digital certificates from the system 500. The certificate acquisition settings can include establishing a timeframe for receiving a certificate, a timeframe for generating a request for acquiring the certificate, and a timeframe for retrying the request for acquiring the certificate. Certificate settings can also include any other setting associated with retrieving the certificate or acquiring information regarding the certificate. The user 502 can view the certificate acquisition settings on a GUI of an iTV application accessible by the STB 508.

Referring now also to FIG. 6, an application screen 600 for customizing certificate acquisition settings. The application 600 features a series of use cases listed for when a new digital certificate will be requested by the STB 508. For each of the use cases different certificate acquisition settings are set, which in this case are timeframes for an initial request for a digital certificate and timeframes associated with retrying a request for the certificate. For example, for the first use case, which is directed to initial setup for all devices within a particular VHO, it will take up to two hours for all digital certificates to load. During such a time a user, such as user 502, will not be able to access an application requiring use of the certificate. If there is a failure, it can take up to six hours before the STB 508 and other STBs retry the certificate request. The STB 508 and other STBs can retry indefinitely at random fractions of six hours until it gets the certificate.

With regard to the second use case, which is directed to certificate acquisition for newly provisioned STBs after the initial certificate acquisition process, it will take up to two hours for all of the certificates to load. Like the first use case described above, the user 502 will not be able to access the application requiring use of the certificate until the certificate is received. Once the certificate is received, there is immediate access to the application. If there is a failure, the STB 508 and other STBs can retry indefinitely at random fractions of six hours until they get their certificates. However, it can be, for example, every thirty minutes.

With regard to the third use case, which is for normal operation after reboot of the STB 508 and after prior successful certificate acquisitions, if there is no failure, a valid certificate can be found in a user store associated with the user. In such a case, the user can access the application requiring the certificate immediately. If there is a failure, under one scenario, a valid certificate is not found in the user store. In this case, it can take up to two hours for a new certificate to be acquired. Under a second failure scenario, a valid certificate is not found in the user store and the certificate request failed. In this case, it can take up to six hours for the STB 508 to retry the certificate request. However, as in the previous use case, the retries can be performed every thirty minutes.

The fourth use case is directed to digital certificate expirations. For example, a certificate can be valid for a random period between thirteen months and two years. The STB 508 continuously checks the expiration time of its certificate. When the certificate is within one hour of expiring, the STB 508 can begin the acquisition process for a new certificate. If there is no failure, a valid new certificate will be acquired before old certificate expires. In this case, the user 502 can access the application requiring the certificate immediately. Under a first failure scenario, a valid new certificate is not acquired before the old certificate expires. During the timeframe between when the old certificate expires (after one hour) and the acquisition of the new certificate (up to two hours), the customer will not be able to access the application. Under a second failure scenario, the new certificate acquisition fails after the old certificate expires. In such a case, it can take up to six hours before the STB 508 retries the certificate request.

The fifth use case is directed to certificate revocation and renewal for compromised certificates due to fraud or to replace certificates during troubleshooting. When a STB, such as STB 508, is compromised, the certificate can be revoked and the certificate can be deleted from the user store. The user 502 will then be unable to access the application requiring the certificate to communicate. The user 502 will require a new certificate in order to access the application. If there is no failure and the user 502 is expecting maintenance activity, it can take up to two hours for a new certificate to be acquired. Once acquired the user 502 can have immediate access to the application. Under a first failure scenario where the user 502 is not expecting maintenance activity, it can take up to two hours for a new certificate to be acquired and the customer cannot access the application until the certificate is acquired. Under a second failure scenario, the certificate acquisition fails and it can take up to six hours before the STB 508 retries the certificate request. Notably, the use cases described above serve only as examples and are not intended to serve as limitations.

Figure 7:
FIG. 7 depicts an application for requesting a status report for certificate acquisition for a given media device.

The user 502 and/or the technicians 504*a-b* can make the STB 508 request a digital certificate based on the certificate acquisition settings or otherwise. As mentioned above the digital certificate can be a certificate conforming to the x.509 standard or other similar standard. While waiting for the certificate or otherwise, the user 502 and/or the technicians 504*a-b*, can request status information and/or a status report pertaining to the acquisition of the certificate for the STB 508. The status information and/or status report can be received by the STB 508 from the RMS 526. Referring now also to FIG. 7, an application 700 for requesting a status report for certificate acquisition for a given media device is shown. The application 700 can be used by the user 502, the technicians 504*a-b*, and the user 502's service provider. Notably, the screen shown can be accessed via a personal computer based application. The application can enable those that are interested, to view the status of the certificate to see what source the loaded certificate was obtained from (e.g. <show trusted root>), and to show the status of the certificate acquisition request from each point in the certificate acquisition flow.

As mentioned above, the RMS 526 can receive events associated with the status of the certificate from various devices in the system 500, such as RTTP 522, certificate authority 524, the STB 508, and IPTV customer facing application servers 518. The events, for example, can indicate a socket/connection failure, a malformed response, that the certificate has been issued, that the certificate was successfully acquired by the STB, that the certificate is pending, that the certificate is expiring, that the certificate has been revoked, and that an acquisition of the certificate has failed. Depending on the source transmitting the events to the RMS, the events can be from the perspective of the transmitting source. As shown in FIG. 7, the STB 508 can transmit an event to the RMS 526 that indicates that the STB 508 has not acquired the certificate and that information can be displayed via the application. Similarly, the RTTP 522 (external certificate web service) and the IPTV customer facing application servers 518 (certificate proxy web service) can similarly indicate the status of the certificate from their perspective or otherwise.

As shown in FIG. 7, the RTTP 522 indicated that it requested the certificate and the IPTV customer facing application servers 518 also indicated that the certificate was requested. The certificate authority 524, however, showed that there was an error and that it was unable to transmit the certificate to the STB 508. The RMS 526 can store all the events in a data store and can be configured to display the received events on the application screen. Notably, FIG. 7 also illustrates that the user 502 can also perform a manual retry request for the certificate or select a back button to return to a previous screen.

Figure 8:
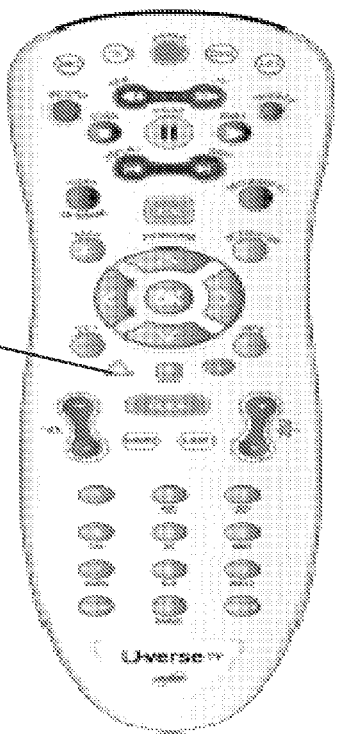
FIG. 8 depicts an exemplary remote control device for accessing an application for viewing the status relating to certificate acquisition.

Referring now also to FIG. 8, a remote control device 800 for accessing the application for viewing the status relating to certificate acquisition is shown. The remote control device 800, which can correlate to remote control device 506 of system 500, can be used by the user 502 to access the certificate acquisition status screen from the STB 508 so as to determine the status of the requested digital certificate. The user 502 can also use the remote control device 800 to request a retry of the certificate acquisition from the status screen by selecting the triangle smart key as shown. Of course, the remote control device 800 can also be configured to interact in other ways with the status screen of the application.

The technicians 504a-b can also select certain status acquisition options for various STBs and other media devices. Referring now also to FIG. 9, an application screen 900 for a service provider for selecting certificate acquisition status options is shown. The technicians 504a-b can, for example, select an option to the poll the certificate status for an individual STB, such as STB 508. The technicians 504a-b can enter in a globally unique identifier (GUID) associated with an STB so that certificate status information associated with the STB can be retrieved and presented to the technicians 504a-b. Additionally, the technicians 504a-b can be given the option of polling the certificate status information for all STBs within an individual household of a user, such as user 502. The technicians can enter in an address so as to retrieve information for all STBs of the user. Furthermore, the technicians 504a-b can be given the option of retrieving certificate status information for an entire market area. The technicians 504a-b can enter in an identifier for the entire market and can retrieve a summary report pertaining to the certificate acquisition statuses for an entire VHO/market.

Referring now also to FIG. 10, an application screen 1000 showing detailed status information pertaining to certificate acquisition for an individual STB is shown. This application screen would be particularly useful for the service provider of a user of the STB. For example, the technicians 504a-b can utilize the screen from FIG. 9 to specify a particular STB with a GUID of ABCD to retrieve certificate acquisition status information for. FIG. 10 can represent the output report once the status information is retrieved. As illustrated, the application screen 1000 can display the GUID of the STB, the certificate status (in this case an x.509 certificate), the certificate authority, the last request for the certificate, when the certificate was acquired, when the certificate expires, and whether or not the certificate was revoked from the user.

Figure 11:
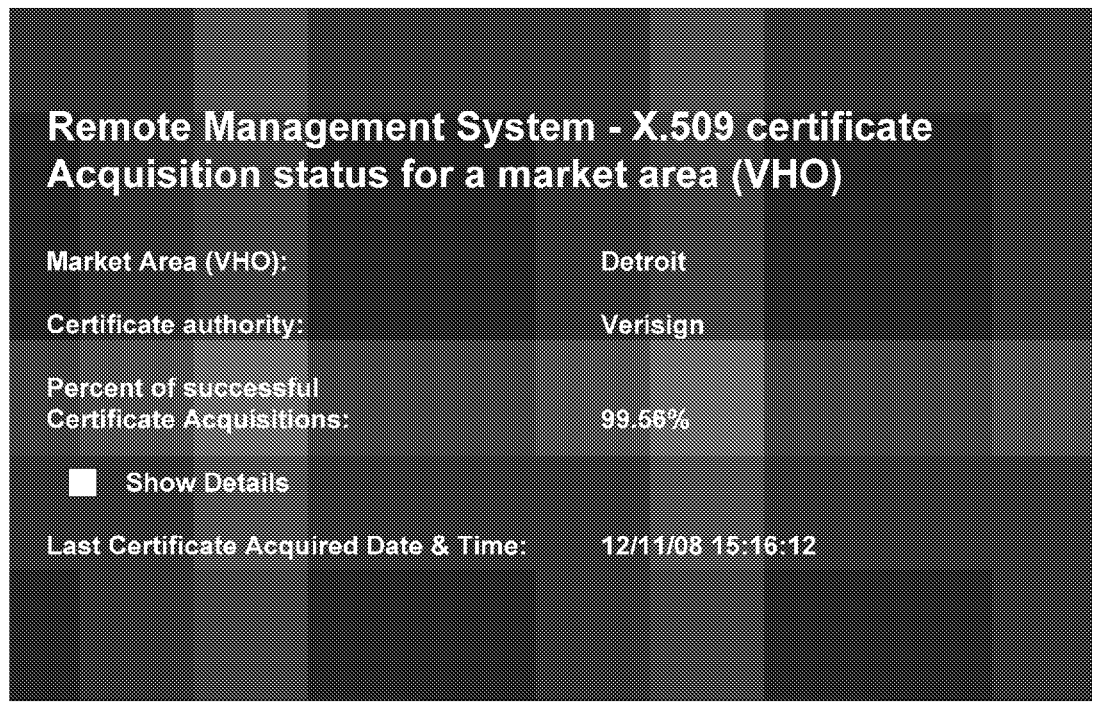
FIG. 11 depicts certificate acquisition status information for an entire market area.

Referring now also to FIG. 11, an application screen 1100 depicting certificate acquisition status information for an entire market area, is shown. The application screen 1100 can be accessed by the technicians 504a-b and can include city associated with a market area, the certificate authority responsible for the market area, the percentage of successful certificate acquisitions, and the date and time for the last certificate acquisition. Such information can aid a technician particularly when the trusted root or certificate authority for an entire market area/VHO has been changed and can aid in determined whether the migration to all the STBs in the entire market area was completed successfully. As an illustration, this can be done when deploying a certificate authority to be used for iTV applications that require secured personalized services on a per STB basis. Additionally, an option can be selected to provide detailed information pertaining to the certificate acquisition. For example, the technicians 504a-b can view certificate acquisition status information for each STB in the market area.

The actual digital certificate can be received by the STB 508 of the user 502 from the certificate authority 524. In an embodiment, the digital certificate can be transmitted from the certificate authority, which received the request for the digital certificate from the STB, to the RTTP 522. The RTTP 522 can then relay the certificate to the IPTV customer facing application servers 518. The IPTV customer facing application servers 518 can then transmit the certificate to the STB 508 via the gateway 514. The user 502 can then view on an application screen displayed on the display device 510 that the digital certificate was successfully received. The STB 508 can transmit information stating that the digital certificate was successfully received to the RMS 526, which can maintain and store the information in its records. Now that the certificate is successfully received at the STB 508 and at an application that the user 502 is trying to access, the user 502 and the an application can mutually authenticate each other. Once authenticated, the user 502 can be authorized to interact with an application.

Figure 12:
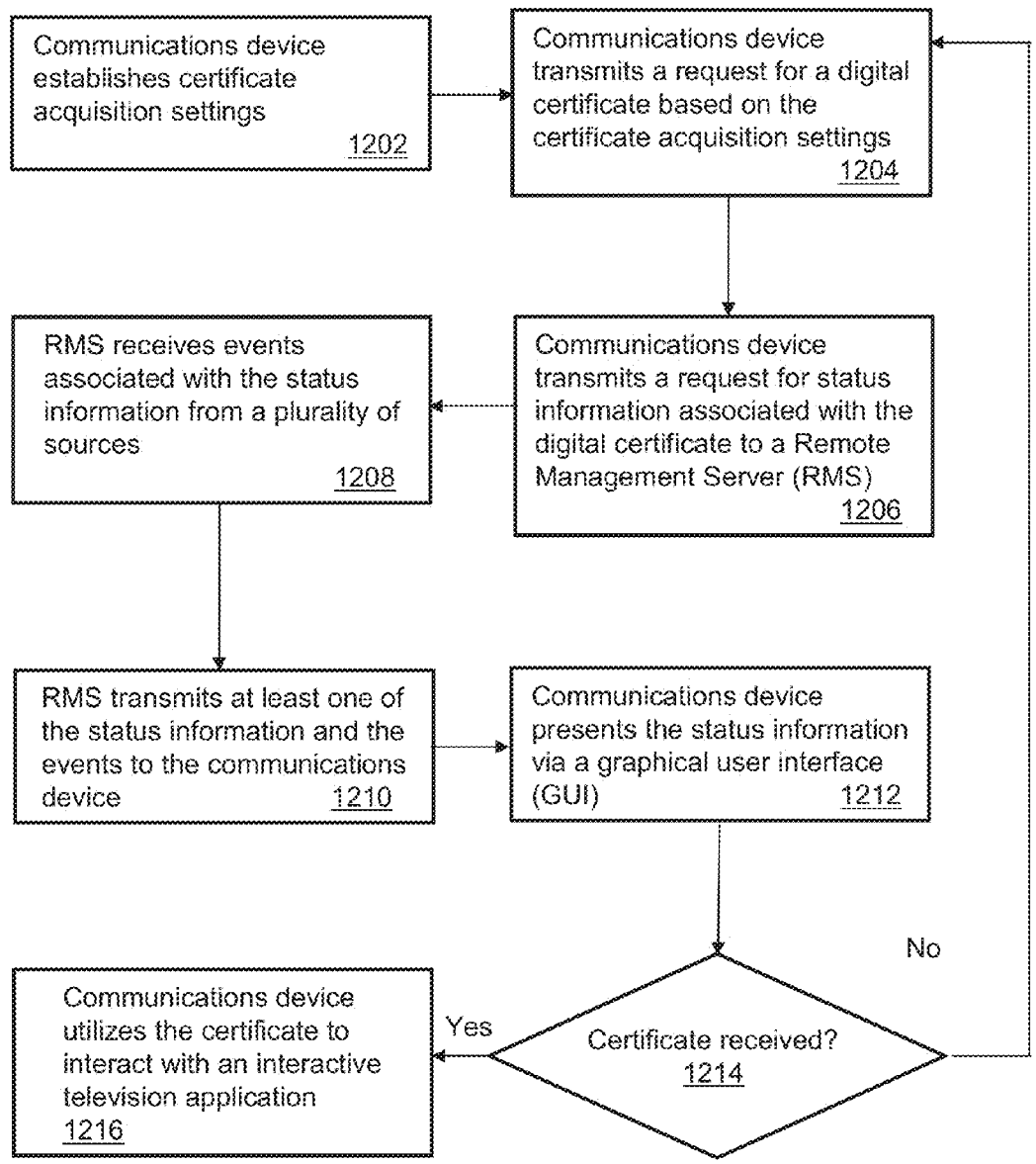
FIG. 12 depicts an illustrative embodiment of a method for monitoring certificate acquisition, which is operable in portions of the communication systems of FIGS. 1-2 and FIG. 5.

FIG. 12 depicts an illustrative method 1200 that operates in portions of the communication systems of FIG. 1-2 and FIG. 5. Method 1200 can begin with step 1202 in which a communications device can establish one or more certificate acquisition settings associated with digital certificates. The communications device can be a STB, mobile device, personal computer, telephone, or other similar device capable of establishing acquisition settings. Additionally, the communications device can be configured to be in communication with an iTV network. As mentioned above the certificate settings can include establishing a timeframe for receiving the certificate, a timeframe for generating a request for acquiring the certificate, and a timeframe for retrying the request for acquiring the certificate. Certificate settings can also include any other setting associated with retrieving the certificate or acquiring information regarding the certificate.

At step 1204, the communications device can transmit a request for a digital certificate based on the established certificate acquisition settings. The digital certificate can conform to the x.509 standard and can be associated with an owner of an application. The request can be relayed to a certificate authority via a certificates proxy and an external certificate web service. Additionally, the communications device can transmit a request for status information associated with the digital certificate to a server, such as RMS 130 at step 1206. The server/RMS 130 can receive various events from a plurality of sources at step 1208. The events can be associated with and provide the status information of the digital certificate. For example, an event can indicate a socket/ connection failure, a malformed response, that the certificate has been issued, that the certificate was successfully acquired by the communications device, that the certificate is pending, that the certificate is expiring, that the certificate has been revoked, and that an acquisition of the certificate has failed.

At step 1210, the server/RMS 130 can transmit at least one of the status information and the actual events to the communications device. Once the status information and/or actual events are received by the communications device, the communications device can present the status information/events. The status information/events can be presented via a GUI, which can be associated with an iTV application that can be accessed by the communications device. At step 1214, the communications device or other devices of the system 100 or 500 can determine whether the digital certificate was received at the communications device. If not, the communications device can retransmit a request for the digital certificate. The request can be based on the certificate settings.

If the digital certificate was determined to be received by the communications device, the communications device can utilize the certificate to securely and/or privately interact with an application associated with the digital certificate at step 1216. Notably, prior to receiving the certificate, the certificate can be signed by a certificate authority authorized to sign and validate the certificate. The certificate can be received from the certificate authority via a external certificate web service and a certificates proxy.

Upon reviewing the aforementioned embodiments, it would be evident to an artisan with ordinary skill in the art that said embodiments can be modified, reduced, or enhanced without departing from the scope and spirit of the claims described below. For example, in an embodiment, a service provider associated with the user 502 can apply restrictions as to how the user 502 can alter or otherwise change the certificate acquisition settings. As an illustration, if the STB 508 associated with the user 502 is meant to only receive a digital certificate once a year, the service provider can apply a restriction which prohibits the user from requesting multiple times during a particular year.

In one embodiment, the RMS 526 can be configured to serve up and display the various application screens provided in FIGS. 6-11. Additionally the RMS 526 can store all events and status information received from the various devices of system 500 for future use.

Other suitable modifications can be applied to the present disclosure without departing from the scope of the claims below. Accordingly, the reader is directed to the claims section for a fuller understanding of the breadth and scope of the present disclosure.

Figure 13:
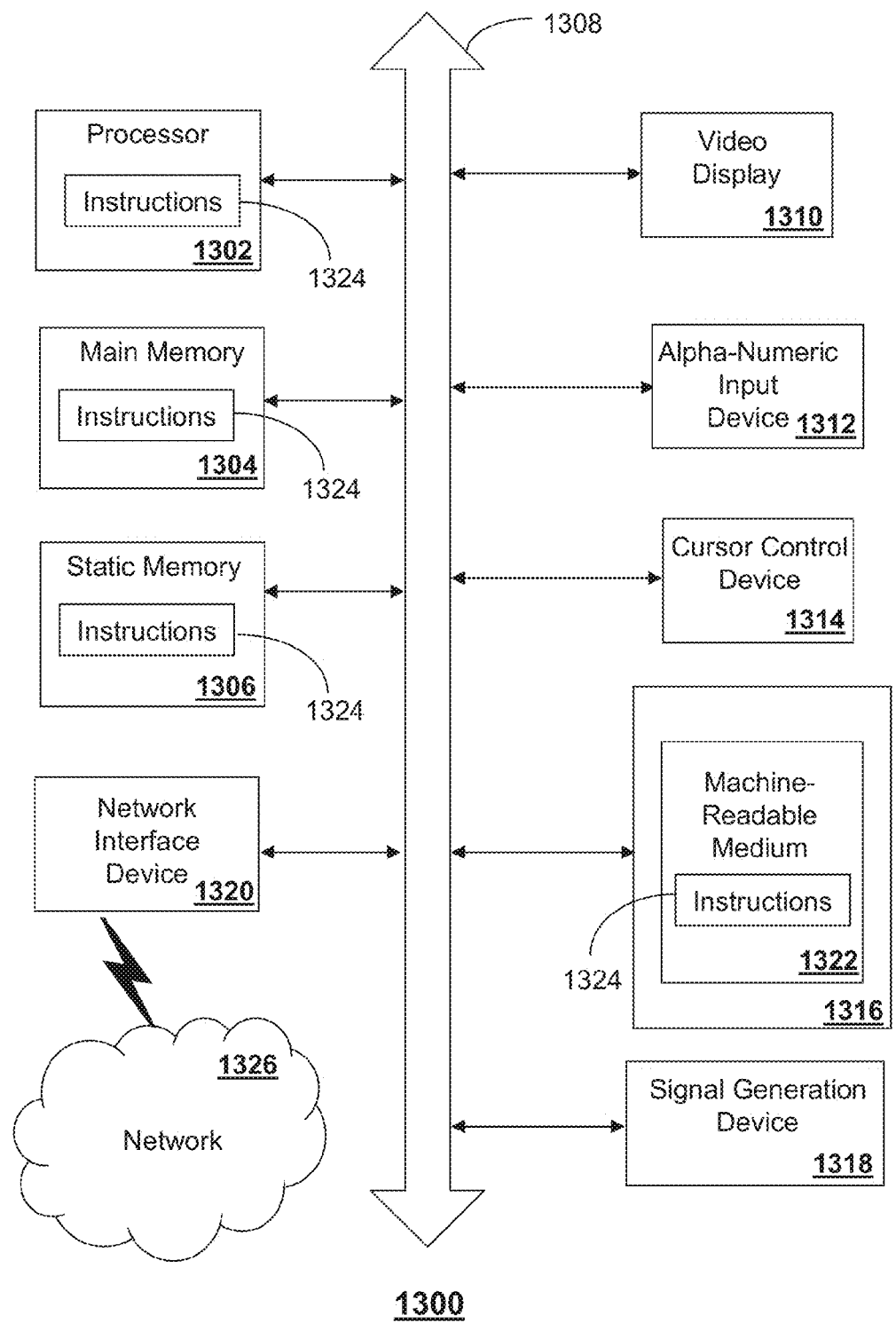
FIG. 13 is a diagrammatic representation of a machine in the form of a computer system within which a set of instructions, when executed, may cause the machine to perform any one or more of the methodologies discussed herein.

FIG. 13 depicts an exemplary diagrammatic representation of a machine in the form of a computer system 1300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1300 may include a processor 1302 (e.g., a central processing unit (CPU), a graphics processing unit (GPU, or both), a main memory 1304 and a static memory 1306, which communicate with each other via a bus 1308. The computer system 1300 may further include a video display unit 1310 (e.g., a liquid crystal display (LCD), a flat panel, a solid state display, or a cathode ray tube (CRT)). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320.

The disk drive unit 1316 may include a machine-readable medium 1322 on which is stored one or more sets of instructions (e.g., software 1324) embodying any one or more of the methodologies or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1324, or that which receives and executes instructions 1324 from a propagated signal so that a device connected to a network environment 1326 can send or receive voice, video or data, and to communicate over the network 1326 using the instructions 1324. The instructions 1324 may further be transmitted or received over a network 1326 via the network interface device 1320.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A set top box, comprising:
    a memory to store computer instructions; and
    a controller coupled to the memory, wherein the controller, responsive to executing the computer instructions, performs operations comprising:
        setting certificate acquisition settings associated with a x.509 certificate intended for the set top box, wherein the certificate acquisition settings include a timeframe for retrying requests for acquiring the x.509 certificate;
        transmitting a request to a remote management server for status information associated with the x.509 certificate, wherein the set top box and the remote management server operate in an interactive television network;
        receiving the status information associated with the x.509 certificate from the remote management server, wherein an event associated with the status information is received by the remote management server from a certificate authority, and wherein the status information comprises at least a portion of the event;
        transmitting a second request for the x.509 certificate to a certificates proxy, wherein the certificates proxy transmits the second request to an external certificate web service, and wherein the external certificate web service transmits the second request to the certificate authority; and
        receiving the x.509 certificate from the certificate authority,
        wherein the remote management server provides the status information associated with the x.509 certificate in a graphical user interface.

2. The set top box of claim 1, wherein the interactive television network comprises an internet protocol television network.

3. The set top box of claim 1, wherein the interactive television network comprises an interactive satellite television network.

4. The set top box of claim 1, wherein the certificate acquisition settings comprise a timeframe for receiving the x.509 certificate, and a timeframe for generating a request for acquiring the x.509 certificate.

5. The set top box of claim 1, wherein the event comprises an indication of a socket/connection failure.

6. The set top box of claim 1, wherein the interactive television network comprises an interactive cable television network.

7. The set top box of claim 1, wherein the graphical user interface is associated with an interactive television application.

8. The set top box of claim 1, wherein the controller performs the operations further comprising receiving the request for status information from a remote control device in communication with the set top box.

9. A method, comprising:
    receiving, by a remote management server, a request from a computing device for status information associated with a digital certificate intended for the computing device, wherein the computing device is in communication with an interactive television network;

receiving, by the remote management server, an event from a certificate authority, wherein the status information is associated with the event;

transmitting, by the remote management server, the status information associated with the digital certificate to the computing device in response to the request, wherein the status information is presented at the computing device via a graphical user interface, and wherein the computing device transmits a second request for the digital certificate to a certificates proxy responsive to receiving the status information from the remote management server, wherein the certificates proxy transmits the second request to an external certificate web service, and wherein the external certificate web service transmitted the second request to the certificate authority which transmits the digital certificate to the computing device; and receiving, by the remote management server, certificate acquisition settings associated with the digital certificate, wherein the certificate acquisition settings comprise a timeframe for receiving the certificate, a timeframe for generating a request for acquiring the certificate, and a timeframe for retrying the request for acquiring the certificate.

10. The method of claim 9, wherein the interactive television network comprises an internet protocol television network.

11. The method of claim 9, comprising storing, by the remote management server, the event and the status information.

12. The method of claim 9, wherein the interactive television network comprises an interactive cable television network.

13. The method of claim 9, wherein the digital certificate comprises a digital certificate conforming to an x.509 standard.

14. The method of claim 9, wherein the event comprises an indication that the certificate is expiring.

15. The method of claim 9, comprising receiving, by the remote management server, events associated with digital certificates associated with a plurality of other computing devices, and further comprising presenting status information associated with the events of the plurality of other computing devices.

16. The method of claim 9, wherein the computing device comprises a mobile device.

17. A non-transitory computer-readable storage medium, comprising executable instructions, which, responsive to being executed by a processor, cause the processor to perform operations comprising:

establishing certificate acquisition settings associated with a digital certificate intended for a set top box, wherein the certificate acquisition settings comprise a timeframe for receiving the certificate, a timeframe for generating a request for acquiring the certificate, and a timeframe for retrying the request for acquiring the certificate;

transmitting a request for the digital certificate based on the certificate acquisition settings;

transmitting a request to a server for status information associated with acquisition of the digital certificate, wherein an event associated with the status information is received by the server from a plurality of sources, wherein the status information comprises at least a portion of the event, and wherein the event includes an indication that the certificate is expiring;

receiving the status information associated with acquisition of the digital certificate from the server;

transmitting a second request for the digital certificate to a certificates proxy, wherein the certificates proxy transmits the second request to an external certificate web service, and wherein the external certificate web service transmits the second request to a certificate authority; and receiving the digital certificate from the certificate authority.

18. The non-transitory computer-readable storage medium of claim 17, wherein the receiving comprises receiving the digital certificate based on the certificate acquisition settings.

19. The non-transitory computer-readable storage medium of claim 17, wherein the set top box operates in an internet protocol television network.

20. The non-transitory computer-readable storage medium of claim 17, wherein the operations further comprise presenting the status information in a graphical user interface.

* * * * *